United States Patent [19]

Zeyher

[11] 3,762,279
[45] Oct. 2, 1973

[54] BRAKING SYSTEM FOR HIGH ACCELERATION OPERATED FREE PISTONS

[75] Inventor: Fritz Zeyher, Ottobrunn near Munich, Germany

[73] Assignee: Messerschmitt-Bolkow-Blohm GmbH, Ottobrunn near Munich, Germany

[22] Filed: Mar. 13, 1972

[21] Appl. No.: 233,909

[30] Foreign Application Priority Data
Apr. 1, 1971  Germany........... P 21 15 770.0

[52] U.S. Cl......... 92/85, 92/172, 188/1 C, 93/36.8, 425/392
[51] Int. Cl............................. F01b 11/02
[58] Field of Search ......... 92/85, 172; 425/392; 93/36.8 X; 188/1 C, 268

[56] References Cited
UNITED STATES PATENTS

| | | | |
|---|---|---|---|
| 2,821,170 | 1/1958 | Jacobus | 92/85 X |
| 3,272,896 | 9/1966 | Winchester, Jr. | 425/392 X |
| 3,396,636 | 8/1968 | Bade | 92/85 X |
| 3,496,840 | 2/1970 | Wandel et al. | 92/85 |

*Primary Examiner*—Martin P. Schwadron
*Assistant Examiner*—Abe Hershkovitz
*Attorney*—John J. McGlew et al.

[57] ABSTRACT

A braking system for high acceleration operated free pistons comprises a cylinder having one end with an inturned flange which provides a stop or abutment for a deformable shell in the form of a cylinder which is opened at each end. The piston, which is freely movable in the cylinder in a direction toward the shell is provided with a concave face on the side facing toward the shell and with a rim which engages behind an inwardly turned rim of the braking shell. The shell is deformed inwardly into the concave recess of the forward end of the free piston upon the impact of the piston against the shell and the deformation of the shell provides a shock absorption for the impact of the piston.

4 Claims, 2 Drawing Figures

BRAKING SYSTEM FOR HIGH ACCELERATION OPERATED FREE PISTONS

BACKGROUND OF THE INVENTION

1. Field of the Invention

This invention relates in general to deceleration devices and, in particular, to a new and useful device for braking the high acceleration of a freely movable piston particularly of a piston used in an antitank grenade launcher.

Deceleration of high-acceleration free pistons, such as pistons used in antitank grenade launchers or the like, is achieved by different means. In accordance with general design principles, the free pistons which are driven by explosive, magnetic or othe forces, are accommodated in pairs in a cylindrical tube and are accelerated from the center of this tube in opposite directions. One of the two pistons may, for instance, eject a projectile on the one side, while the other piston may accelerate a so-called counter mass. The resulting discharge is substantially free from recoil. The projectile caliber or counter mass caliber and its cross-sectional discharge clearance should approach, as closely as possible, the internal diameter of the cylindrical tube (Caliber) so that the dimensions may be kept as small as possible. During the acceleration process, the two ends of the cylindrical tube should be closed by the two free pistons so as to prevent explosion flames and powder gases escaping. Furthermore, in most instances, soundless (muffling) or almost soundless operation is desired.

2. Description of the Prior Art

In another known arrangement, a braking or deceleration system includes a driving plate serving as the piston which is slowed down by means of material deformation after performing the stroke and for this purpose it is provided with a suitable creasing or deformation area. Alternatively, the component (braking ring) against which the driving plate or piston runs, can become deformed or, the chaser teeth provided thereon may be shorn off or the travel end may be conically tapered.

In order to effect energy dissipation, it is necessary that the components contributing to these systems are of large dimensions, or else long brake paths have to be accepted. In the first case, an additional requirement is the disproportionately strong reduction of the actual projectile caliber by comparison with that of the cylinder.

SUMMARY OF THE INVENTION

In accordance with the invention, the disadvantages of the known systems are avoided by providing a deformable shell, for example, of a plastic material, and preferably in the form of a cylindrical tube, which is secured in the end of the cylinder toward which the free piston is movable. The cylinder is advantageously provided with an inturned flange or collar which forms a stop or abutment which prevents the outward movement of the deformable cylindrical tube at this end of the cylinder. With the inventive construction, the freely movable piston is provided with a concave end face on the end facing the deformable cylindrical tube and its corners are sized to engage behind a bevelled rim of the deformable cylindrical tube. The bevel or chamfer is of a form such as to cooperate with the concave end of the a free piston so that impact movement of the piston against the cylindrical tube causes an inward deformation of the walls of the tube and an absorption of the impact shock.

Contrary to the systems of the art of record, the action of the free piston in this arrangement does not bring about an expanding deformation of the brake shell, but it has a crushing and shrinking effect upon the brake shell deforming it so as to reduce its original diameter. Consequently, the wall thickness of the brake shell can be of very small dimension so that the aforementioned differences in caliber between projectile and projectile counter mass, on the one hand, and the cylinder on the other hand, are very small.

A further advantage of the inventive construction is the fact that the frictional forces obtained during the deformation process between the brake shell and the piston base settle on an area of the brake shell which enlarges inwardly in a substantially concentric manner. The result is an even distribution of stress upon the piston base which in turn facilitates its design.

An additional advantage obtained in this arrangement is that the actual length of the brake path is extraordinarly short because the negative acceleration curve has a strongly progressive effect, which has to be considered another essential factor in favor of the desired weight reduction to be achieved. This braking characteristic is controllable in certain areas, particularly by the geometrical design of the concave piston base indentation. This indentation is concentric having a base diameter approaching the outside diameter of the piston and it may have or approach the shape of a spherical indentation. Its depth is determined largely by the length of the brake path. The other possibility of influencing the brake characteristic consists in the provision, on the brake shell, of suitable preset breaking or deformation points in the form of bores, notches, grooves, etc.

Accordingly, it is an object of the invention to provide an improved deceleration system comprising a cylinder in which a free piston is movable toward an end thereof and with a brake shell arranged in the end which has a portion located in the path of travel of the piston and is constructed and formed so that it is deformed inwardly by the impact of the piston thereagainst.

A further object of the invention is to provide a braking system for a freely movable piston comprising a cylinder in which the piston is freely movable having a collar formation at one end forming a stop or abutment for a cylindrical plastic deformation member which includes a beveled rim engageable behind an approaching edge of the piston and cooperable with a concave end face of the piston to move inwardly in a formation manner on impact by the piston thereagainst.

A further object of the invention is to provide a deceleration system which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
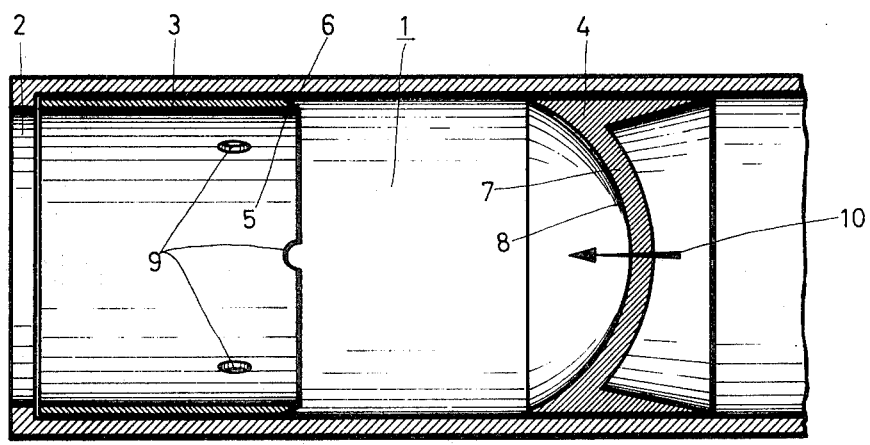
FIG. 1 is a partial axial sectional view of an antitank grenade launcher constructed in accordance with the invention.

Referring to the drawing in particular, the invention embodied therein comprises, a grenade launcher cylinder 1 having a collar or inturned flange 2 at its one end which forms a stop against which a disposable brake shell or impact receiving body, generally designated 3, is positioned. The brake shell 3 is made of cylindrical tubular form and it is sized to move freely within the cylinder 1 and to be arrested or stopped by the collar 2 so that it cannot be moved out of the cylinder.

In accordance with the invention, the brake shell 3 on the side facing a freely movable piston 4, is chamfered or beveled around a rim 5 so as to form a cooperating surface with a concavely formed end face 8 of a base portion 7 of the piston 4. A wedge-shaped slot 6 is defined between the beveled rim 5 of the brake shell 3 and a cylinder wall 1 into which moves the rim of the piston 4 at the base portion 7 as the piston moves in the direction of the arrow 10, for example, after the grenade launcher has been actuated. The impact of the piston 4 against the braking cylinder 3 causes an inward movement and deformation of the wall of the cylinder 3 to provide a shock absorption of the impact of the 3 and a dissipation of the energy of the shock of braking. The construction of the body shell 3 shown in FIG. 1 includes a plurality of openings 9 forming preset deformation points or weakened areas.

Figure 2:
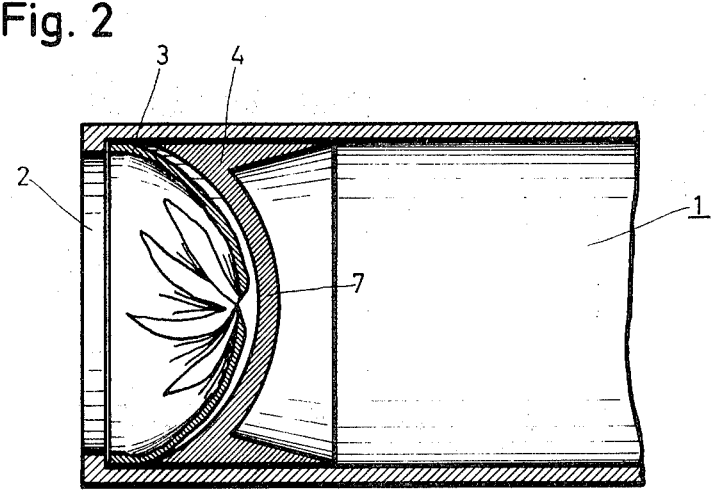
FIG. 2 is a view similar to FIG. 1 showing the deformed brake shell after the piston has moved to its end position.

In the end position shown in FIG. 2, the shell 3 is shown in plastic deformation with the piston 4 being located almost to the inner end of the collar 2.

While a specific embodiment of the invention has been shown and described in detail to illustrate the application of the principles of the invention, it will be understood that the invention may be embodied otherwise without departing from such principles.

What is claimed is:

1. A deceleration system for high acceleration operated free pistons, comprising a cylinder, a free piston movable in said cylinder, a collar formed on said cylinder adjacent one end, a disposable brake shell of a plastically deformable material located within said cylinder and secured against ejection by said collar, said piston having a piston base facing toward said brake shell with a concave indentation, said shell having an end engageable within said concave indentation of said piston base and being deformable inwardly within said base upon impact of said piston against said shell to absorb the impact shock.

2. A deceleration system, according to claim 1, wherein said brake shell is provided with a chamfered rim forming a wedge-shaped annular slot between said rim and said cylinder.

3. A deceleration deceleration system for high acceleration operated free pistons, comprising a cylinder, a free piston movable in said cylinder, a collar formed on said cylinder adjacent one end, a brake shell of deformable plastic material located within said cylinder and secured against ejection by said collar, said piston having a piston base facing toward said brake shell with a concave indentation, said shell having an end engageable within said concave indentation of said piston base and being deformable within said base upon impact of said piston against said shell to absorb the impact shock, said brake shell being provided with a chamfered rim forming a wedge-shaped annular slot between said rim and said cylinder, said brake shell also having weakened areas to cause the walls thereof to collapse and move around the surface of the concave end portion of said piston.

4. A deceleration system for a recoilless weapon, comprising a cylinder, a free piston movable in said cylinder, and a plastically deformable and disposable brake shell secured against movement beyond a fixed location within said cylinder located in the path of travel of said piston, said piston having an end facing said shell with a concentric concave recess extending substantially over its whole cross section, said shell having a peripheral portion facing said piston of a size to engage within the recess of said piston when it is moved toward said brake shell so as to be deformed inwardly by the curvature of the piston recess by the impact of the piston thereagainst to collapse its wall inwardly and to cause its plastic deformation while it stops the movement of said piston.

* * * * *